United States Patent [19]

Marczewski

[11] 4,051,741

[45] Oct. 4, 1977

[54] DRIVE BELT WITH CONNECTOR

[76] Inventor: George A. Marczewski, 4109 Chapmans Road, R.D. No. 1 Green Hills, Orefield, Pa. 18069

[21] Appl. No.: 698,200

[22] Filed: June 21, 1976

[51] Int. Cl.² ............................................. F16G 1/00
[52] U.S. Cl. ................................................. 74/231 J
[58] Field of Search ........................... 74/231 J, 231 R

[56] References Cited

U.S. PATENT DOCUMENTS

| 3,501,971 | 3/1970 | Petrson | 74/231 J |
|---|---|---|---|
| 3,631,732 | 1/1972 | Kleban | 74/231 J |
| 3,777,586 | 12/1973 | Stirton | 74/231 J |
| 3,788,156 | 1/1974 | Jackson | 74/231 J |
| 3,857,294 | 12/1974 | Edouart | 74/231 J |
| 3,922,759 | 12/1975 | Mabie | 74/231 J |

*Primary Examiner*—Leonard H. Gerin
*Attorney, Agent, or Firm*—Clarence A. O'Brien; Harvey B. Jacobson

[57] ABSTRACT

A drive belt with connector together with assembly tools for proper installation of the connector to the two open ends of a single portion of belt material. The main belt together with the flexible connector body are constructed of cord sections in various configurations and include in many embodiments a central spring member for adding strength and flexibility to the overall belt and means of connecting the belt. One tool is used to hold the respective ends of the main belt portion while the other tool holds the connector unit for engagement and connecting relationship with the two ends in order to form the overall completed belt structure.

21 Claims, 15 Drawing Figures

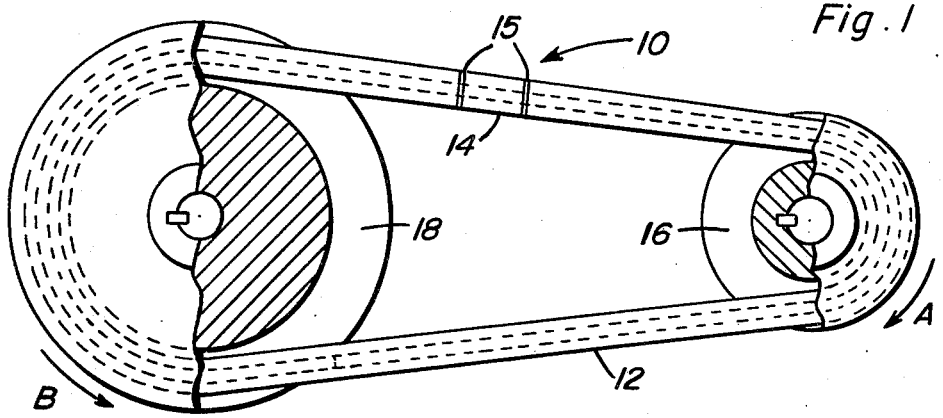
Fig. 1
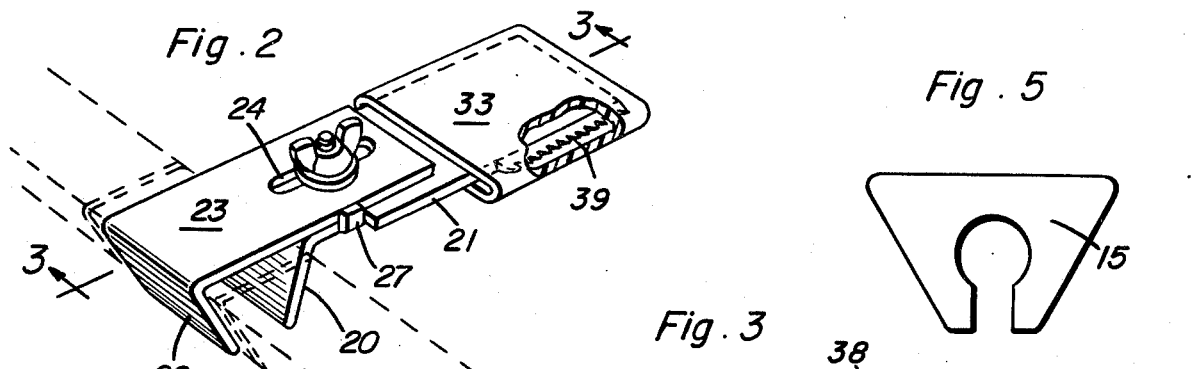
Fig. 2 Fig. 5 Fig. 3
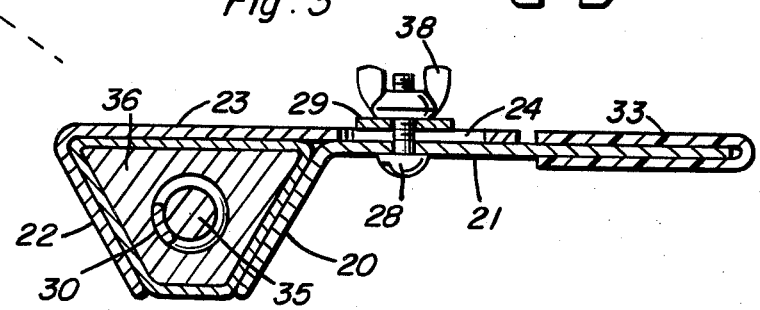
Fig. 4
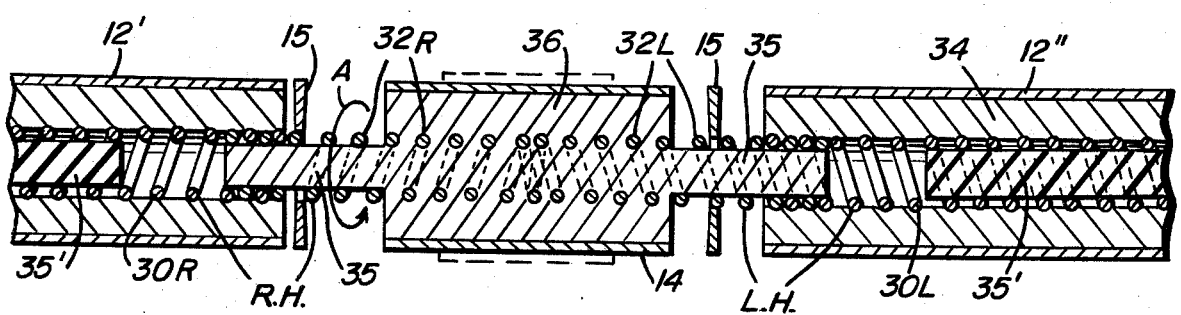
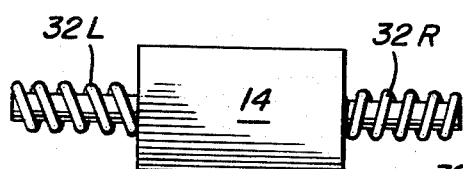
Fig. 6
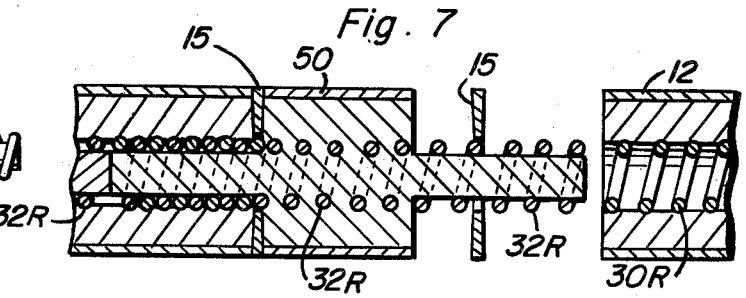
Fig. 7

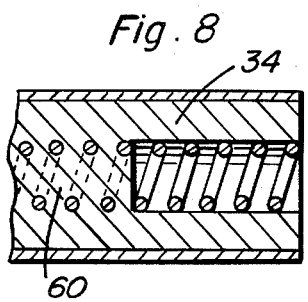
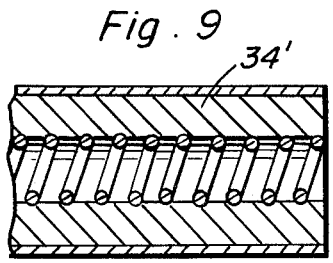
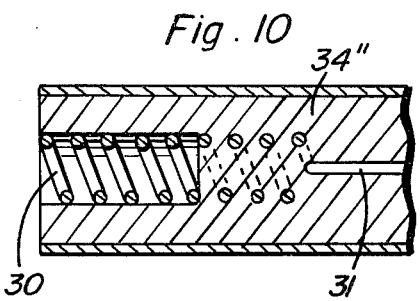
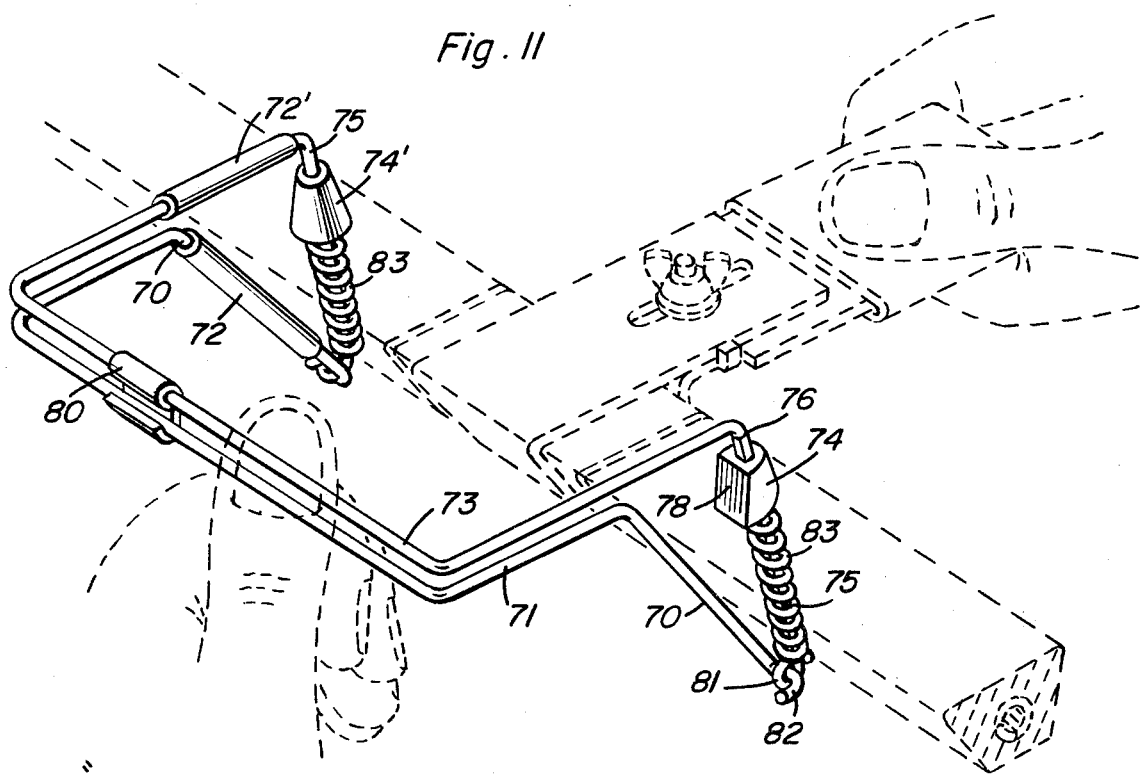
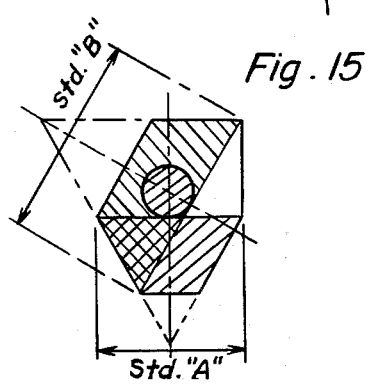
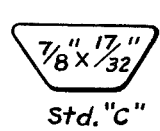
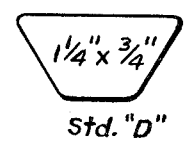
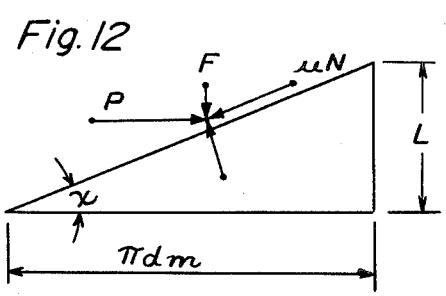

DRIVE BELT WITH CONNECTOR

BACKGROUND OF THE INVENTION

1. Field of the Invention

This invention relates generally to belts which are used for conveying drive power from one pulley to another and is especially related to a primary belt member having a connector portion for fastening the two ends of the primary member together in interlocking relationship to form the completed overall drive belt.

2. Description of the Prior Art

A common problem with known belt type devices is that the pulleys which the belt rides upon must be accessible in order to replace a worn or used belt thereupon. In many commercial installations this is a major chore to remove the drive shafts, etc. in order to gain access to the drive and driven pulleys. With a belt as disclosed herein this problem is solved. The belt is fed over the inaccessible portions of the pulley and then a drive connector link used between the two open ends of the primary portion of the belt to interconnect same and form the completed overall endless belt structure. Thus the belt may be replaced and installed without any necessity for access to the pulleys or drive shafts therefor and this installation will include the right belt tension.

Another problem with known type belts is that even though they may be split and interconnected in a manner similar to the disclosed invention the connecting portion is not securely fastened either by friction or other means to the end portions of the primary belt to prevent unlocking of the connector in heavy usage of the belt.

Another problem with known devices is that the overall strength of the completed belt in many instances is not nearly as strong or good as that of preferred endless belts. In many drive applications the overall strength of the belts is a very important and critical factor.

Another problem with prior device is that they are not easily installed and connected together and proper tools for ease of installation are not generally provided or available.

Another problem is that the known prior art devices have certain standard configurations which in mamy cases will be suitable, but certain modified embodiments offer some advantages not heretofore known.

Known prior art patents which may be pertinent to this invention are as follows:

U.S. Pat. No. 1,215,196: 2/6/17
U.S. Pat. No. 1,429,638: 9/19/22
U.S. Pat. No. 3,076,736: 2/5/63
U.S. Pat. No. 3,501,971: 3/24/70
U.S. Pat. No. 3,631,732: 1/4/72
U.S. Pat. No. 3,788,156: 1/29/74

None of these known prior art devices offers the new and unique features of the invention disclosed herein.

SUMMARY OF THE INVENTION

An object of the present invention is to provide a drive belt with connector which may be quickly installed between a drive and driven pulley arrangement with simplicity and ease.

Another object of the present invention is to provide a primary belt portion which is connectible between its two ends by means of a similarly configured belt connector and with said connector being positively retained between the two ends of the primary portion once the connector is properly installed.

A further object of this invention is to provide a connector and drive belt structure which utilizes a central core member for increased strength and positive retention of the connector portion.

A still further object of this invention is to provide means between the drive connector and the two ends of the primary belt member which will positively lock and prevent unconnection of the connector from the drive belt proper.

A still further additional object of this invention is to provide complementary tools for holding the two respective ends of the primary drive belt member and another tool which will hold the connector portion for proper installation of the connector member with the drive belt primary member.

Still further additional object is to provide a specially configured belt structure which will permit a single belt arrangement to be supplied in kit form together with the necessary tools for installation of same for use by the average home mechanic, automobile mechanic, etc. The drive belt connector and tool assembly of this invention offers a number of advantages over previous type devices. The drive belt may be provided in a number of configurations and just a few basic lengths for application to many different job situations. The primary drive belt together with its complementary connector offers a strong overall assembly once assembled and when provided in an unassembled condition together with the tools as specifically designed for use therewith offers a handy and extremely useful kit for quickly repairing and replacing most broken belt situations.

Another very important feature of this invention is that the overall belt assembly once completed is just as strong or in some cases even stronger than a preformed endless belt which it replaces.

The main belt and flexible connector body is constructed of cord section, a belt cover and one piece right or left hand helical spring or springs. The cord section can be made of rubber or other suitable material. The belt cover is only needed for rubber belts and usually is of cotton or rayon fabric. Some belt styles have inserted inside the main belt spring a round soft rubber cord section or sections. The spacers used with the belt and connector provide an assurance that the connector will not unscrew itself under tension.

A still further feature of this invention is in the method of assembly of the belts having the helical center spring as follows: turn main belt spring so the spring diameter becomes smaller by 0.015 inch; slide the main belt body over the spring; release the spring so it returns to its original form; insert cord rubber pieces inside the spring; outside diameter of cord pieces shall be 0.005 inch less than inside diameter of spring after assembly.

The basic components of this invention together form an assembly which may be quickly put together and yet form very strong belts of various cross section configurations for power transmission. The complete belt consists of a main primary belt member, a flexible connector member, and two spacer washers. Appropriate holding and assembly tools assist the user in putting the belt together. For rubber belts the sides of the spacer washers can be applied with rubber cement glue. For all other belts (and even those including rubber) the spacers can be made with the flat surfaces slightly concave.

In either case, after the tightening of the flexible connector between the two ends of the primary belt member, the friction on the spacer surfaces will overcome the torque on the center helical spring and positively prevent unlocking or disconnection of the connector between the ends.

This quick-on belt arrangement operates and functions the same as any standard, widely used belt structure body in the industry. One of the primary uses thereof is for power transmission through the V-belt from one pulley to another. If has a few additional advantages over a conventional one-piece preformed V-belt structure. They are as follows:

1. The belt is simple and quick to install and disassemble without removing any pulleys, adjacent parts or readjusting pulley take-up. This enables a plant to cut shutdown time to a very minimum, improves maintenance efficiency, and provides a quick belt installation which is so vital to production machinery.

2. The construction as disclosed herein has longer life because of the following factors:
   a. Belt flexibility eliminates high belt tensions caused by overloads;
   b. The configuration of the belt prevents excessive belt slippage because of higher friction between the belt and the pulley. This equalizes the angular velocity ratio between the two policy shafts. Also, the centrifugal force on the belt in high speeds is neutralized by this additional belt friction. A explanation for this appears to be that when the belt is hugging the pulley, the bottom of the helical spring will come closer together and the top will part slightly causing the belt's gripping sides to expand. This in fact, will cause a higher belt friction and tension. This can only be accomplished because of the way the spring is assembled inside the main belt; and
   c. This construction eliminates most of the accumulation of the weakening effects of momentary overloads due to vibration, shock, and belt slapping.

3. Because of the way the belt is assembled and because of how it is made the spring inside the belt would not stretch due to tension as it would normally in any other type spring which is simply inserted into a belt (Hook's Law). The spring in the belt of this invention becomes part of the main belt and the tension loads are transmitted through the whole cross section of the belt. Tension loads in places where spacers are located are transmitted through total cross section of flexible connector spring and spring internal cord. The splice becomes just as strong as the main belt.

4. The flexible connector is just as flexible as the main belt. This makes a belt as assembled by this invention totally flexible without any stiff or solid internal or external parts.

5. The belt of this invention, after assembly, does not have any movable parts.

6. With the flexible connector as disclosed herein both sides of the main belt will receive equal length of the connector's extended parts for equal belt load distribution.

7. If the belt is too long after assembly, a flexible connector can be unscrewed, the main belt portion recut to the correct length, and reassembled. In case of a mistake in cutting the main belt too short initially, the belt can still be used by adding spacers on both sides of the connectors.

8. In case of the belt breaking, the belt can be fixed by unscrewing the connector, adding a main belt repair link (either left hand or right hand as needed for the portion of the main belt which broke), two spacers, and reassemble the belt. In case the belt breaks in point of spring changing from left-hand to right-hand, the flexible connector itself may act as a repair link. The tools needed to do such a repair job are the same as the ones needed to assembly the belt in the first place.

9. Because there are no parts extending from the entire belt assembly and because of its flexibility the belt of this invention can be used with idler operation. That is the belt can bend backwards upon itself such as is very common with many air conditioner installations on the average automobile engine and no detrimental effect will occur as a result.

10. Additional spring forces on the main belt inside the structure together with the connector spring portions provide additional assurance in addition to the spacer members against the connector unscrewing itself under tension.

11. Because of its re-usability, long life, length adjustability and length combinations, the belt of this invention reduces greatly the necessary inventory of belt sizes and lengths which normally would be stocked by most maintenance or repair facilities.

12. The belt of this invention also opens a new field of use for V-belts for places where belts are not normally used because there is no accessibility to the pulleys or drive shafts thereof. The main belt can be fished out between pulleys and then connected only in the open area which just requires a few square inches.

13. The belt of this invention is designed to be widely used in industry, and by every car and home appliance owner. It can be extremely useful if a car fan belt breaks while driving on the highway and especially simplifies installation of a second belt behind the radiator cooling fan. While the belt of this invention is very useful and applicable to temporary belt applications, it is also designed and constructed for use in permanent belt type installations. To provide the above advantages, the belt and installation tools of this invention should be made available in hardware, appliance, and auto supply stores in the various belt sizes and styles which normally are found in the field, and also may be provided in the form of a belt emergency kit. This kit would include the right sizes, lengths, and numbers of main belts, their related flexible connections, spacers, a number of left-hand and right-hand belt repair links, and a belt assembly holding tool, and the connector unit assembling tool, together with written and illustrated assembling instructions.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

BRIEF DESCRIPTION OF THE DRAWINGS

FIG. 1 is a side view, partly in cross section, of the drive belt and connector of this invention.

FIG. 2 is a perspective view of the tool for applying the connector.

FIG. 3 is a cross-sectional view taken generally along line 3—3 of FIG. 2.

FIG. 4 is a cross-sectional side view through the centerline of FIG. 1 showing the two ends of the belt together with the connector member.

FIG. 5 is a side view of a connector spacer member.

FIG. 6 is a side view of a connector member by itself.

FIG. 7 is a repair link member as in use for repairing a broken primary belt member, viewed in cross-section.

FIG. 8 is a modified embodiment showing a left-hand helical spring section.

FIG. 9 is a another modified embodiment showing a left-hand helical spring section.

FIG. 10 is a modified embodiment showing a right-hand helical spring section.

FIG. 11 shows in solid lines the complementary tool for holding the respective ends of the primary belt member together with the connector tool indicated in dotted lines.

FIG. 12 is a diagram depicting the friction formula of the connector unit in relationship to the ends of the primary belt member.

FIG. 13 shows a cross section of a standard "C" type belt and a cross section of a standard "D" type belt.

FIG. 14 shows two other standard belt configurations.

FIG. 15 is a cross-sectional view of a modified shape of a double purpose belt as envisioned by this invention.

DESCRIPTION OF THE PREFERRED EMBODIMENT

Referring to FIG. 1 of the drawings, referenace numeral 10 indicates in general the primary belt together with connector as envisioned by this invention. The primary belt member of conventional type cross section is indicated by reference numeral 12 and the connector unit for the two ends of the primary member is indicated by reference numeral 14. The belt is shown as assembled between two pulleys 16 and 18. As installed, it is recommended that if pulley 16 be the driver pulley, rotation be in the direction of arrow A, and if the pulley 18 is to be the drive pulley, then the preferred rotation would be in the direction of arrow B.

The tool for holding and assembling the connector link is shown in FIGS. 2 and 3. One side of the connector is engaged by a portion 20 extending from a handle 21 while the other side of the connector link is engaged by the portion 22 appropriately tapered so as to complement the cross section of the connector, as best seen in FIG. 3, which suspends from the slidable portion 23. An aperture 24 is provided in the member 23 and a bolt 28 mounted in an appropriate aperture in the handle 21 passes through said aperture 24 and has a flat washer 29 and locknut 38 screwed thereupon. This offers a quick manner of loosening and tightening the slidable member 23 with respect to the main handle member 21. On the other end of the handle 21 from the connector engaging portion 20 is serrated knife edge 39 for appropriate cutting of the main belt member to desired and suitable length. A protective cover 33 normally is provided over the knife edge 29. Looking at FIG. 2, a guiding projection 27 of metal formed from the handle 21 functions as a guide member for the slidable portion 23. A corresponding guide projection 27 may be provided on the opposite edge of the handle, not shown, in the same configuration and manner. The guide projections or flanges 27 together with the slot 24 and the bolt 28 maintain member 23 in proper alignment and parallel to the main handle 20, 21.

FIG. 4 shows the two ends of the primary belt member 12' and 12" being connected with a connector link. The two ends 12' and 12" may be held by a tool as shown in FIG. 11 and described below, while the connector link is held by the tool already described above. The end of the primary belt member 12' has a right-hand thread helical spring mounted in the center thereof while the end of the primary belt member 12" has a left-hand helical spring member therein. Normally the endless primary belt member 12 will incorporate the helical spring center structure with the hand of the spring changing or reversing at approximately the mid-point of the member. Thus one end of the member will always have a right-hand thread helix while the other end will always have a left-hand spring helix. A spring element is indicated by reference numeral 30 and the hand is indicated by a R or L after the reference numeral. The connector link 14 has a central core structure 36 with a helical spring projecting from either end thereof in the manner best seen in FIGS. 4 and 6. A central core portion 36 solidly embeds the helical spring therein with projecting central members 35 provided for supporting the left-hand and right-hand helical spring projections therearound.

Thus as can be visualized by viewing FIG. 4, when the connector unit is rotated in the direction of the arrow A, the projecting right-hand portion 32R will screw into the right hand helical end 30R of the belt, and the other end of the connector having the left-hand threads 32L will screw into the left-hand helical spring 30L of the other end of the primary belt. While the fit of the spring portions together will in most cases positively secure the connector as screwed into the end portions and prevents unlocking or unconnection of the ends and form a permanent overall belt structure, additional means to ensure this are provided. This is provided by the spacer members 15 seen in side view in FIG. 5. These spacers 15 may have a slight concave shape in cross section as viewed in FIGS. 4 and 7. When the spacer members are used they may have additional glue or epoxy applied on either side thereof to add additional securing friction to said spacers. Once assembled the connector will not unscrew from the two ends of the primary belt member. It should be noted that for very large diameter pulleys and sheaves and for use with very high horsepowers, the belts preferably are constructed with double helical springs at 18° offset. This greatly increases the overall strength of the belts. Also the spacers need only be used if after tightening the connector member 14 link between the two ends of primary belt 12, and as tightened if the flat sides and back of the belt do not line up, then the spacers may be used to add additional flexibility and degree of tensioning to the overall belt structure so that the connector sides will be able to line up with the primary belt structure.

FIG. 12 shows a formula for the relationship of the connector and the primary belt ends insofar as the amount of friction and the amount of torque required to overcome the friction and clearly supports the position disclosed herein that the connector will be positively prevented from unlocking by itself.

FIG. 7 shows the use of a repair connector link 50 having a construction similar to that of the connector 14, the difference being in the fact that the projecting spring helix members are all of the same hand. That is in the example shown in FIG. 7 both projecting portions have a right-hand helix thereto. This is for the purpose of repairing a portion of the primary belt member 12 in the case of breakage or severage thereof. If the right-hand section is broken then a repair member 50 having right-hand projections 32R would be used to make the repair. In the case of the primary belt being broken at the portion that has a left-hand helix thread in the center thereof, then a repair link 50' with left-hand threads 32L, not shown, would be used.

The belt member 12', 12", shown in FIG. 4, has central cores 35' extending therethrough of fiber and the like and in lengths not exceeding central member 35 of the connector. In FIG. 8, a modified embodiment is shown wherein the helical spring member is constructed without a central core 35, as described above, but with the helica spring embedded within the primary cord section of the belt as shown and labelled 60. In FIG. 9, another embodiment is shown wherein the helical spring section is provided within the central core of the body 34' and without any central cord strand whatsoever or other support within the center of the helix other than by the unique belt spring assembly.

FIG. 10 shows a further embodiment wherein only the end portion of the center wire 30L has a helix thereto while a short distance in from the end of the core 34" the wire becomes a solid flexing element 31 for the major portion of the belt until close to the opposite end where it again ends up in a helix of right-hand thread.

FIG. 11 shows the complementary tool for use with the connecting holding tool of FIGS. 2 and 3. This tool comprises portion 70 for engaging one of the tapered sides of the two ends of the primary belt member with one of the engaging members 70 being covered with a roller 72. A handle portion 71 connects the two belt engaging portions 70. Another handle portion 73 has extending portions 75 to complement the extending portions 70, 72 of the other handle 71. Springs 83 normally are provided around the portions 75 for positively moving the belt engaging members 74, 74' into side engagement with the belt for belt size automatic adjustment. As can be seen the member 74 is partially circular in section with a tapered flange edge 78 direct belt engagement. Also the inner aperture of said member 74 is of square shape to slidably engage with the square shape portion 76 provided on the member 75. This design prevents the member 74 from rolling and stops the belt from sliding off. A clamp 80 is provided to lockably hold the handles 71 and 73 together. The lower ends of portions 75 have eye 81 provided at the ends thereof for reception of the hooks 82 on the ends of members 70. As can be visualized by viewing FIG. 11, the clamp structure just described will releasably hold the respective ends of the primary belt member 12 while the connector member 14 is being rotated with the other assembly tool 21, 23 already described. The end of the belt held between members 74 and 70 stays stationary and the other belt end held between members 74', 72 and 72' slides when turning the assembling tool, allowing members 74', 72 and 72' to rotate.

FIG. 13 shows standard cross sections of belt configurations of approximately 7/8 × 17/32 inch and 1¼ × ⅞ inches. Both of these cross sections of standard belt types are well known in the field.

FIG. 14 shows two other standard belt configurations.

FIG. 15 shows a modified belt construction which will replace many of the standard belt sections in use today. As can be seen, looking at FIG. 15 taken across the width of a vertical cross section, the belt will replace a standard A section of ½ × 5/16 inch or a standard C section of ⅞ × 17/32 inch as in FIG. 13. Taken across the other oblique side of the cross section the belt will replace standard B or standard D sections. A standard B being 21/32 × 13/32 inch and a standard D being 1¼ × ⅞, as described in FIG. 14. Thus with a belt embodiment as shown in FIG. 15, supplied in a kit having a similar configured primary belt member 12, together with the connector member 14 in the same shape shown in FIG. 15, and the appropriate assembly tools of FIGS. 2 and 11, very large numbers of belt applications can be handled with this one kit.

The belt assembly procedures will now be described. First the flexible connector unit would be placed in the assembly tool of FIG. 2; shown being held in the right hand in FIG. 11. Next the adjustable portion 23 of the assembly tool is moved to grip the connector tightly. Then the wing nut 30 on the assembly tool is tightened to lock the connector in place. Then the main belt portion 12 is threaded through the belt pulleys as required. Then holding the two open ends of the primary belt member, the installation and assembly tool 71, 73 is opened and the two respective ends of the belt placed between the portions 70, 72 and 74, 74'. The assembly clamp 80 is then locked in place for positively retaining the ends in spaced relationship. The spacer members 15 are then placed upon the projecting helical ends of the connector and glue applied as appropriate, or in the case of the spacer being pre-coated with glue and having glue protective covers, said glue covers removed before assembly of the spacers. Then the flexible connector is placed between the ends of the primary belt and the connector screwed into the ends thereof. It is important that the flexible connector and the main belt surfaces are in the same plane upon completion of the tightening operation. Once this has been achieved the respective assembly tools are both removed and the apparatus on which the belt is installed is ready for use.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A drive belt and connector combination comprising; an elongated member of pulley engaging configuration, central means including an elongated element arranged along the center line of the elongated member and extending from one end to the other thereof, and connector means engageable with the said central means for the purpose of connecting the two ends of the elongated member to form a closed belt, said connector means including structure for complementing the central means within the elongated member in order to form a semi-permanent non-unlocking type connection between the two ends.

2. A drive belt and connector combination comprising; an elongated member of pulley engaging configuration, central means arranged along the center line of the elongated member and extending from one end to the other thereof, and connector means engageable with the said central means for the purpose of connecting the two ends of the elongated member to form a closed belt, the central means including a helical spring extending through the entire length of the elongated member.

3. The structure as set forth in claim 2, wherein the connecting means includes a complementary helical spring structure for engagement with the ends of the helical spring extending through the elongated member and for interlocking relationship therewith.

4. The structure as set forth in claim 3, wherein the complementary structure referred to includes a helical spring of reverse hand to that of the central helical spring means.

5. The structure as set forth in claim 4, wherein the central helical spring is arranged to provide a right-hand thread at one end of the elongated member and a left-hand thread at the other end of the elongated member, and the connector has complementary right and left-hand spring portions extending a short distance from each end of the connector.

6. The structure as set forth in claim 5, together with an assembly tool for gripping the connector in order to hold and rotate same between the two ends of the elongated member in order to install the connector in order to complete and endless belt.

7. The structure as set forth in claim 6, together with a complementary tool for holding the two ends of the elongated member spaced on either side of the connector during the assembly of same.

8. The structure as set forth in claim 7, wherein the configuration of the belt type structure is in a special shaped form which will function as a drive belt of at least two conventional sizes.

9. The structure as set forth in claim 5, wherein the main belt includes the helical spring assembled by turning of the spring until it becomes smaller in diameter and after releasing it returns to its original form and becoming spring and main belt as one member.

10. The structure as set forth in claim 2, wherein the configuration of the belt type structure is in a special shaped form which will function as a drive belt of at least two conventional sizes.

11. The structure as set forth in claim 1, together with an assembly tool for gripping the connector in order to hold and rotate same between the two ends of the elongated member in order to install the connector in order to complete an endless belt.

12. The structure as set forth in claim 11, together with a complementary tool for holding the two ends of the elongated member spaced on either side of the connector during the assembly of same.

13. A connection unit for repairing a broken drive belt comprising; a short section of belt type structure configured for pulley engaging drive, belt engaging means extending from each end of said section for connection between and to the broken ends of a drive belt for repairing same, the belt engaging means including a helical spring of the same hand extending from the respective ends of the short section of belt type structure.

14. The structure as set forth in claim 13, wherein the belt type structure is configured in a wedge shape of conventional belt type cross section.

15. The structure as set forth in claim 14, wherein the configuration of the belt type structure is in a special shaped form which will function as a drive belt of at least two conventional sizes.

16. A drive belt and connector assembly tool comprising; a handle member having a tapered projection extending from one end thereof and for engagement with a tapered side of a V-belt configured member, a second adjustable member mounted upon said first member and slidable therealong and having a secod flanged belt engaging member for the purpose of engaging an opposite side of the V-belt shaped member, and means for lockably holding said two members together.

17. The structure as set forth in claim 16, wherein the lockable adjustable means comprises a bolt with locknut arranged thereon for finger adjustment of the respective members.

18. The structure as set forth in claim 17, wherein a belt cutter knife structure is provided on the other end of the primary handle member.

19. The structure as set forth in claim 18, wherein a protective cover is provided for the knife cutting portion of the handle.

20. A belt drive and connector combination assembly tool comprising; a primary handle member having spaced belt engaging members along the outer edges thereof, a second handle member having complementary belt engaging means spaced along the outer edges thereof, and means for linking the two members together so that they may be opened with respect to each other for the insertion of respective ends of a primary belt member and upon closing will support said respective ends in a spaced relationship there apart.

21. The structure as set forth in claim 20, wherein the belt engaging structure on at least one of said belt engaging members includes a specially shaped belt engaging portion together with resilient spring means for firmly pressing said member against the side of the said belt.

* * * * *